US011694065B2

(12) United States Patent
Murphy et al.

(10) Patent No.: US 11,694,065 B2
(45) Date of Patent: Jul. 4, 2023

(54) SPIKING NEURAL UNIT

(71) Applicant: Micron Technology, Inc., Boise, ID (US)

(72) Inventors: Richard C. Murphy, Boise, ID (US); Glen E. Hush, Boise, ID (US); Honglin Sun, Boise, ID (US)

(73) Assignee: Micron Technology, Inc., Boise, ID (US)

(*) Notice: Subject to any disclaimer, the term of this patent is extended or adjusted under 35 U.S.C. 154(b) by 527 days.

(21) Appl. No.: 16/553,537

(22) Filed: Aug. 28, 2019

(65) Prior Publication Data

US 2021/0064963 A1    Mar. 4, 2021

(51) Int. Cl.
G06N 3/049    (2023.01)
G06N 3/063    (2023.01)
G06N 3/048    (2023.01)

(52) U.S. Cl.
CPC ............ G06N 3/049 (2013.01); G06N 3/048 (2023.01); G06N 3/063 (2013.01)

(58) Field of Classification Search
CPC ....... G06N 3/049; G06N 3/0481; G06N 3/063
See application file for complete search history.

(56) References Cited

U.S. PATENT DOCUMENTS

| 5,050,095 | A | 9/1991 | Samad |
| 7,043,466 | B2 | 5/2006 | Watanabe et al. |
| 2004/0073764 | A1 | 4/2004 | Andreasson |
| 2015/0039547 | A1 | 2/2015 | Kang et al. |
| 2018/0082176 | A1* | 3/2018 | Wu .......................... G06N 3/049 |
| 2018/0260696 | A1 | 9/2018 | Suda et al. |
| 2019/0042920 | A1* | 2/2019 | Akin ...................... G06N 3/063 |
| 2019/0156190 | A1 | 5/2019 | Nino et al. |
| 2019/0156194 | A1 | 5/2019 | Burr |

FOREIGN PATENT DOCUMENTS

EP    3343459 A1 *    7/2018    ............. G06N 3/049

OTHER PUBLICATIONS

Seo et al., "A 45 nm CMOS Neuromorphic Chip with a Scalable Architecture for Learning in Networks of Spiking Neurons," in IEEE Custom Integrated Circuits Conf. 1-4 (2011). (Year: 2011).*
International Search Report and Written Opinion from related international patent application No. PCT/US2020/047764, dated Dec. 3, 2020, 11 pages.
Yilong Guo, et al., "Unsupervised Learning on Resistive Memory Array Based Spiking Neural Networks", Front. Neurosci, Aug. 6, 2019, Retrieved from: https://doi.org/10.3389/fnins.2019.00812, pp. 1-15 and figures 1-4.

* cited by examiner

*Primary Examiner* — Kamran Afshar
*Assistant Examiner* — Ryan C Vaughn
(74) *Attorney, Agent, or Firm* — Brooks, Cameron & Huebsch, PLLC

(57) ABSTRACT

Devices and methods related to spiking neural units in memory. One device includes a memory array and a complementary metal-oxide semiconductor (CMOS) coupled to the memory array and located under the memory array, wherein the CMOS includes a spiking neural unit comprising logic configured to receive an input to increase a weight stored in a memory cell of the memory array, collect the weight from the memory cell of the memory array, accumulate the weight with an increase based on the input, compare the accumulated weight to a threshold weight, and provide an output in response to the accumulated weight being greater than the threshold weight.

16 Claims, 6 Drawing Sheets

SPIKING NEURAL UNIT

TECHNICAL FIELD

The present disclosure relates generally to memory, and more particularly to apparatuses and methods associated with spiking neural units in memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), 3D XPoint™, resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

Artificial neural networks are networks that can process information by modeling a network of neurons, such as neurons in a human brain, to process information (e.g., stimuli) that has been sensed in a particular environment. Similar to a human brain, neural networks typically include a multiple neuron topology (e.g., that can be referred to as artificial neurons).

DETAILED DESCRIPTION

Figure 1:
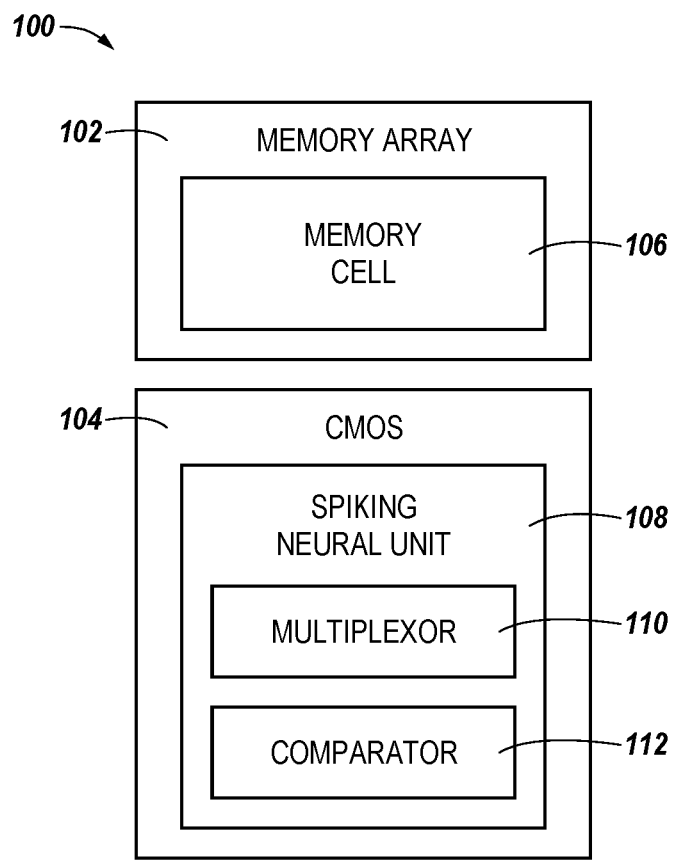
FIG. 1 is a block diagram of an apparatus including a memory array and a complementary metal-oxide-semiconductor (CMOS) in accordance with a number of embodiments of the present disclosure.

The present disclosure includes apparatuses and methods related to spiking neural units in memory. An embodiment includes a memory array and a complementary metal-oxide semiconductor (CMOS) coupled to the memory array and located under the memory array, wherein the CMOS includes a spiking neural unit comprising logic configured to receive an input to increase a weight stored in a memory cell of the memory array, collect the weight from the memory cell of the memory array, accumulate the weight with the increase based on the input, compare the accumulated weight to a threshold weight, and provide an output in response to the accumulated weight being greater than the threshold weight. In some examples, the spiking neural units in the CMOS coupled to the memory array can reduce processing time and increase the performance of a device.

Spiking neural units can be used for information processing applications including machine learning (e.g., deep learning). For example, spiking neural units can be used for image recognition, sound recognition, and/or natural language processing.

The spiking neural units can include multiplexors and comparators. A multiplexor can collect a weight stored in memory cells and a comparator can compare the weight from the memory cells to a threshold weight. In some examples, it can be determined that a spiking neural unit has spiked and learning has occurred in response to the weight from the memory cells being greater than the threshold weight. For example, computer sensing, speech recognition (e.g., from a user), machine translation, and/or social network filtering can be processed using spiking neural units.

As used herein, "a number of" something can refer to one or more of such things. For example, a number of memory devices can refer to one or more memory devices. A "plurality" of something intends two or more. Additionally, designators such as "K", "L", "M", "N", "P", "Q", "R", and "S", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, reference numeral 104 may reference element "04" in FIG. 1, and a similar element may be referenced as 204 in FIG. 2. In some instances, a plurality of similar, but functionally and/or structurally distinguishable, elements or components in the same figure or in different figures may be referenced sequentially with the same element number (e.g., 209-1, 208-2, 208-3, and 208-M in FIG. 2). As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a memory device 100 including a memory array 102 and a complementary metal-oxide-semiconductor (CMOS) 104 in accordance with a number of embodiments of the present disclosure. As used herein, an "apparatus" can refer to, but is not limited to, a variety of structures or combinations of structures. For instance, memory array 102 and CMOS 104 might also be separately considered an "apparatus." As illustrated in FIG. 1, the CMOS 104 can be located under (e.g., below) the memory array 102. The memory array 102 can be formed on the CMOS 104. For example, a bottom surface of the memory array 102 can contact and/or be coupled to a top surface of the CMOS 104.

The memory array 102 can include one or more memory cells 106 and the CMOS 104 can include a spiking neural unit 108. The spiking neural unit 108 can comprise logic. The logic can be, for example, a logic component including a plurality of logic blocks configured to perform operations. The operations can include receiving an input to increase a weight stored in the one or more memory cells 106 of the memory array 102, collecting the weight from the one or more memory cells 106 of the memory array 102, accumulating the weight with the increase based on the input, comparing the accumulated weight to a threshold weight, and providing an output in response to the accumulated weight being greater than the threshold weight.

In some examples, the spiking neural unit 108 can include a multiplexor 110 and/or a comparator 112. The multiplexor 110 can be coupled to the memory array 102 and can collect the weight from the one or more memory cells 106 of the memory array 102. Collecting the weight can include sensing signals corresponding to weighted inputs of artificial neurons from the one or more memory cells 106. One or more sense amplifiers can sample the sensing signals and transmit the sensing signals from the memory array 102 to the spiking neural unit 108 included in the CMOS 104 under the memory array 102. Although not shown in FIG. 1, in some examples, the memory array 102 and the spiking neural unit 108 can transmit sensing signals and be coupled to each other via one or more communication lines.

The multiplexor 110 can collect the weight from the one or more memory cells 106 in response to a particular period of time passing since previously collecting the weight with the increase and/or in response to a particular number of signals being applied to the one or more memory cells 106. In some examples, the multiplexor 110 can collect the weight in response to the spiking neural unit 108 receiving a command.

In response to receiving an input to increase the weight, an accumulated weight with the increase based on the input can be calculated. For example, a summation function can be performed to accumulate the weight with the increase based on the input.

The comparator 112 can compare the accumulated weight to the threshold weight. A threshold function (e.g., step function) can be used to compare the accumulated weight to a threshold weight. The threshold function can determine if the accumulated weight is above or below the threshold weight. The threshold function can generate a logic high output (e.g., logical 1) on an output if the accumulated weight is greater than or equal to the threshold weight and can generate a logic low (e.g., a logical 0) on the output if the accumulated weight is below the threshold weight, for example. The threshold weight can be a weight sufficient to indicate that learning has occurred.

In a number of embodiments, the spiking neural unit 108 can store the accumulated weight in the memory array 102.

The spiking neural unit 108 can store the accumulated weight in the memory array 102 in response to the accumulated weight being less than the threshold. For example, the one or more memory cells 106 of the memory array 102 can continue to increase the weight and store the accumulated weight when the spiking neural unit 108 has not yet spiked and learning has not yet occurred.

The one or more memory cells 106 that stored the weight can be refreshed (e.g., reinforced) to store the accumulated weight. After storing the accumulated weight, the one or more memory cells 106 can be refreshed to prevent the accumulated weight from changing over time (e.g., drifting). The one or more memory cells 106 can be refreshed in response to the one or more memory cells 106 receiving an input to increase the weight stored in the one or more memory cells and/or in response to a refresh command. In some examples, the one or more memory cells 106 can be refreshed in response to a particular period of time passing since previously refreshing the one or more memory cells 106.

In a number of embodiments, the one or more memory cells 106 can be erased. For example, the accumulated weight stored in the one or more memory cells 106 can be deleted. The accumulated weight stored in the one or more memory cells 106 can be deleted in response to the accumulated weight being greater than the threshold weight and/or in response to providing an output. For example, the one or more memory cells 106 can be erased when the spiking neural unit 108 has spiked and learning has occurred. However, embodiments are not so limited, as in at least one embodiment, the one or more memory cells 106 can continue to store the accumulated weight after the spiking neural unit 108 has spiked.

Figure 2:
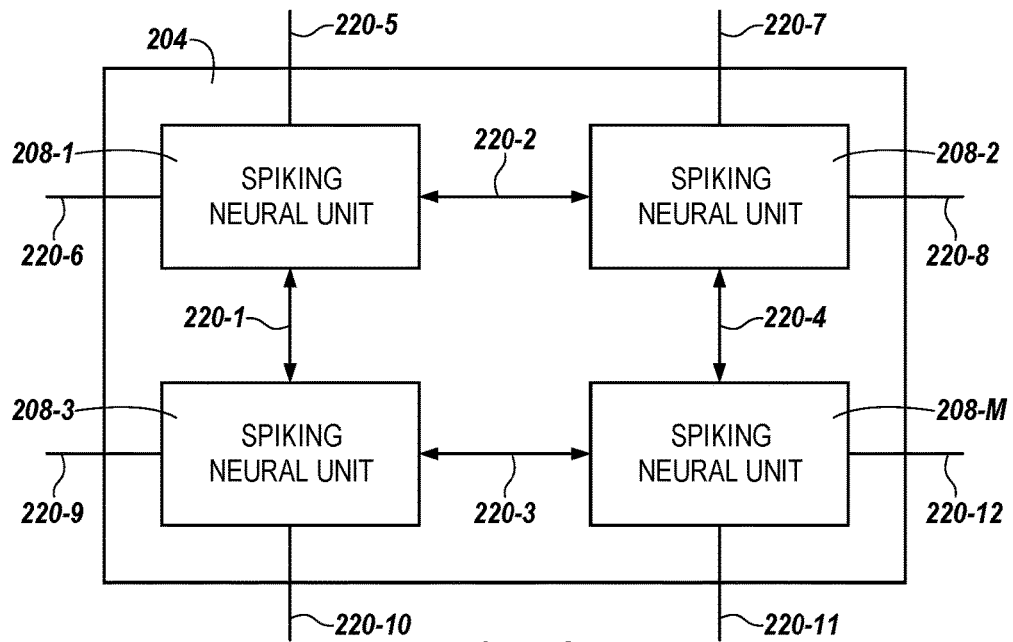
FIG. 2 is a block diagram of a complementary metal-oxide-semiconductor (CMOS) including a plurality of spiking neural units in accordance with a number of embodiments of the present disclosure.

FIG. 2 is a block diagram of a complementary metal-oxide-semiconductor 204 (CMOS) including a plurality of spiking neural units 208-1, 208-2, 208-3, . . . , 208-M in accordance with a number of embodiments of the present disclosure. The plurality of neural spiking units 208-1, . . . , 208-M can transmit data and be coupled to each other via communication lines 220-1, 220-2, 220-3, . . . , 220-4. The communication lines 220-1, . . . , 220-4 can interconnect the spiking neural units 208-1, . . . , 208-M in rows and columns. The spiking neural units 208-1, . . . , 208-M can also include communication lines 220-5, 220-6, 220-7, 220-8, 220-9, 220-10, 220-11, 220-12 extending off of the neural spiking units 208-1, . . . , 208-M and/or off of the CMOS 204. Communication lines 220-5, . . . , 220-12 can couple the spiking neural units 208-1, . . . , 208-M to spiking neural units on a different CMOS and/or to a controller. The communication lines 220-1, . . . , 220-12 can enable data communication between the spiking neural units 208-1, . . . , 208-M, between the spiking neural units 208-1, . . . , 208-M and spiking neural units on a different CMOS, and/or between spiking neural units 208-1, . . . , 208-M and a controller.

The plurality of spiking units 208-1, . . . , 208-M can each comprise logic. The logic can be, for example, a logic component including a plurality of logic blocks configured to perform operations. The operations can include receiving an input, via one of the plurality of spiking units 208-1, . . . , 208-M, to increase a weight stored in one or more memory cells of a memory array, collecting, via one of the plurality of spiking units 208-1, . . . , 208-M, the weight, accumulating the weight with an increase based on the input, comparing the accumulated weight to a threshold weight, and providing an output in response to the accumulated weight being greater than the threshold weight. The accumulated weight can be stored back in the one or more memory cells of the memory array in response to the accumulated weight being less than the threshold weight.

Each of the plurality of spiking units 208-1, . . . , 208-M can be configured to receive an input to increase a weight stored in a plurality of memory cells of a memory array. The input can be sent from a controller through one or more of the plurality of spiking units 208-1, . . . , 208-M via communication lines 220-1, . . . , 220-4. The input can be an electrical signal, for example, a voltage applied to one or more of the plurality of spiking units 208-1, . . . , 208-M.

The weight can be collected by one of the plurality of spiking units 208-1, . . . , 208-M. The weight can be collected in response to a particular period of time passing since previously collecting the weight, in response to a particular number of signals being applied to the one or more memory cells, and/or in response to the one of the plurality of spiking neural units 208-1, . . . , 208-M receiving a command. In some examples, the weight can be collected using a multiplexor.

Each of the plurality of spiking units 208-1, . . . , 208-M can accumulate a respective weight with a respective increase based on the input and compare the accumulated weight to a threshold weight. The threshold weight can be a sufficient weight for learning to occur. The accumulated weight and the threshold weight can be compared in response to accumulating the weight and/or in response to the one of the plurality of spiking neural units 208-1, . . . , 208-M receiving a command. The particular period of time can be set based on an average time it takes the plurality of spiking units' 208-1, . . . , 208-M accumulated weight to reach the threshold weight. In some examples, the accumulated weight and the threshold weight can be compared using a comparator.

The output (e.g., the result of the comparison of the accumulated weight to the threshold weight) can be provided from a first spiking neural unit 208-1 to a controller via a second spiking neural unit 208-2 and/or directly from the first spiking unit 208-1 to the controller. In some examples, the output can be provided in response to the accumulated weight being greater than the threshold weight. For example, spiking neural unit 208-1 can send the output to a controller to notify the controller that learning has occurred. In some examples, the controller can be external to the memory array and the CMOS 204.

In a number of embodiments, the plurality of spiking neural units 208-1, . . . , 208-M can be included in a neural network. The neural network can perform various machine learning algorithms to process inputs. Example tasks that can be processed by a neural network can include computer vision, speech recognition, machine translation, social network filtering, and/or medical diagnosis.

Figure 7:
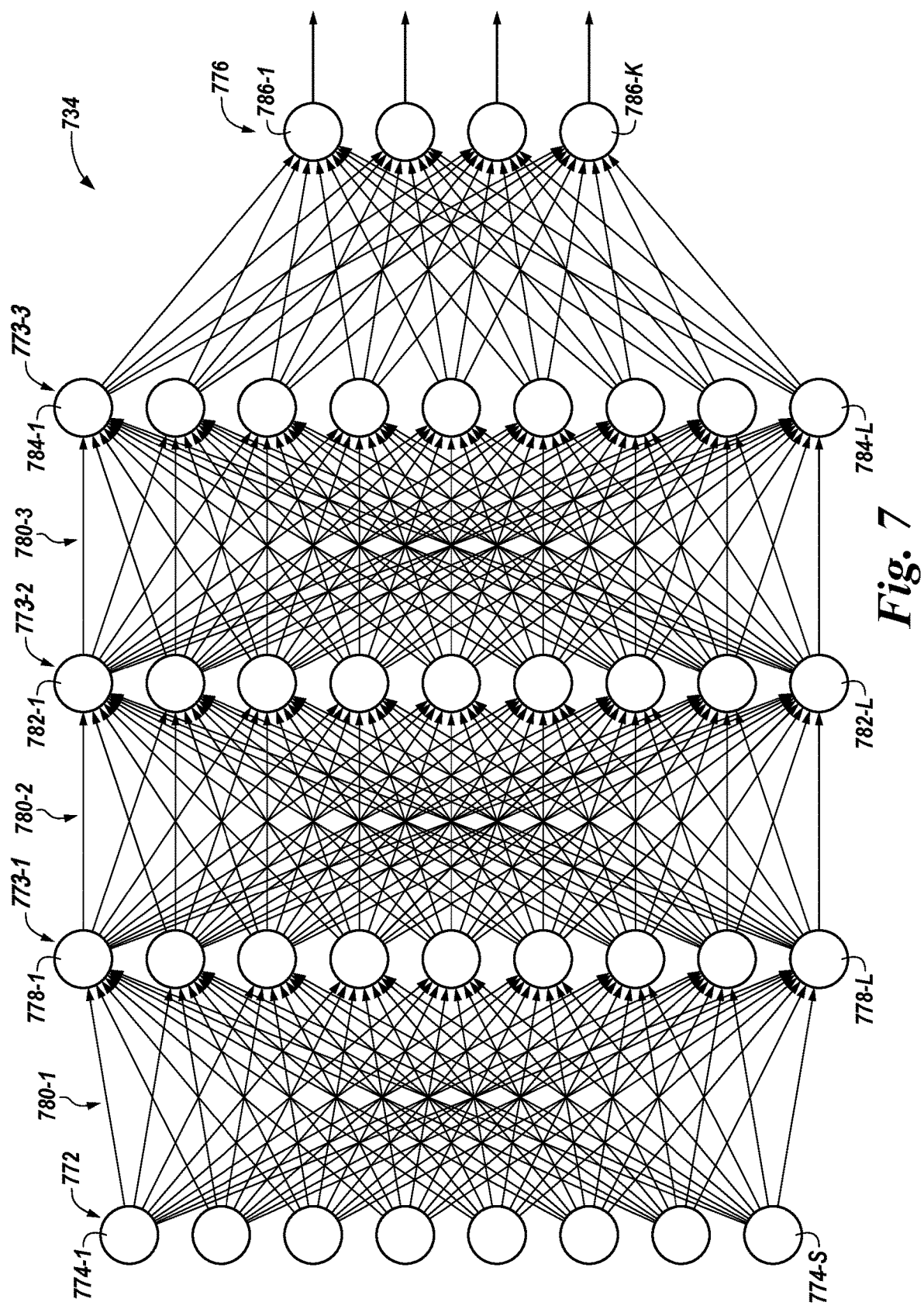
FIG. 7 illustrates an example neural network in accordance with a number of embodiments of the present disclosure.

The neural network can include a plurality of layers each including one or more of the plurality of spiking neural units 208-1, . . . , 208-M, as described further in connection with FIG. 7. The output from one of the plurality of spiking neural units on a layer, for example, the first spiking neural unit 208-1 can be received by a different spiking neural unit on a different layer, for example, the second spiking neural unit 208-2. One or more memory cells can be refreshed. A refresh can include a read and write operation on one or more memory cells. For example, a refresh can rewrite the weight stored in the one or more memory cells to preserve the weight data. A refresh can be performed on one or more memory cells in response to an accumulated weight being less than a threshold weight. As previously discussed, the threshold weight can be a sufficient weight for learning to occur.

One or more memory cells can be erased. An erase can remove data from one or more memory cells. The weight stored in the one or more memory cells can effectively be erased in response to an accumulated weight reaching a threshold weight. One or more memory cells can be effectively erased when the data are read and not refreshed. In some examples that use memory cells other than DRAM, one or more memory cells can be erased by an active erase mechanism.

Figure 3:
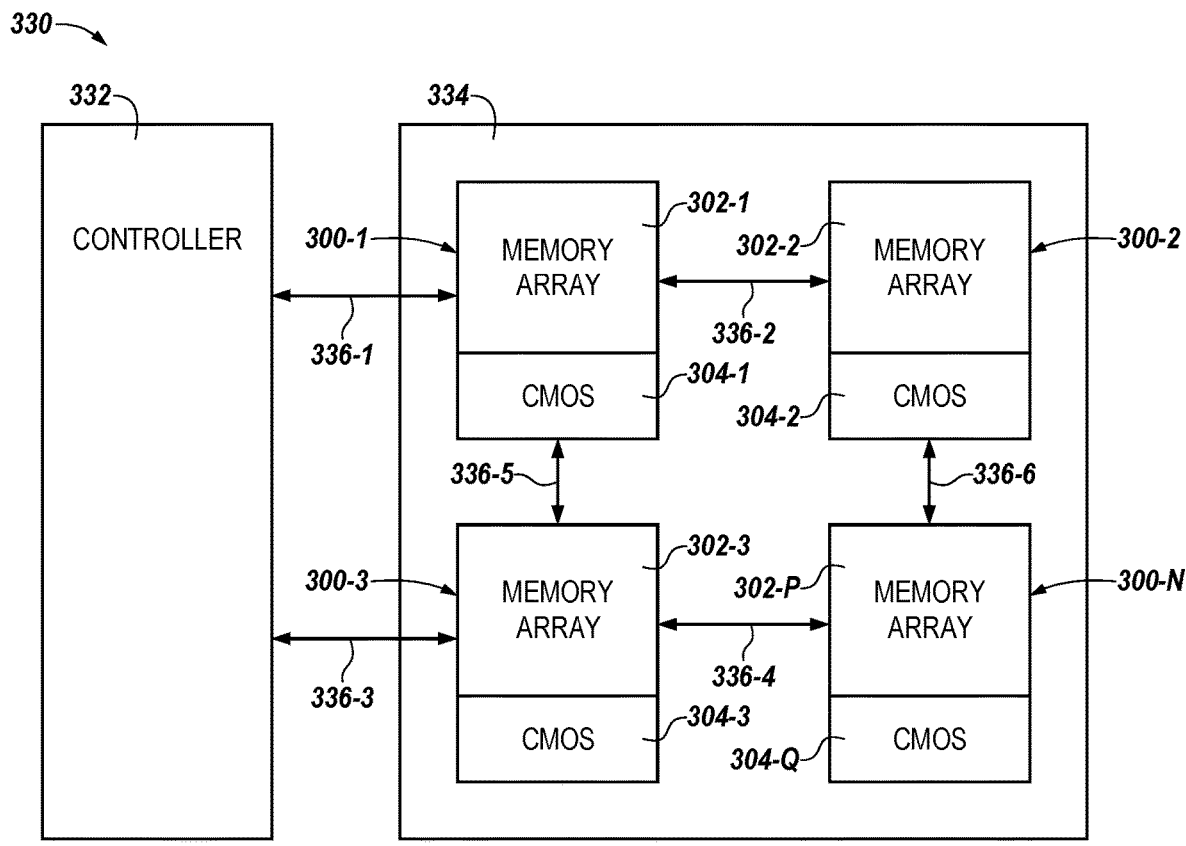
FIG. 3 is a block diagram of a system including a controller and a neural network in accordance with a number of embodiments of the present disclosure.

FIG. 3 is a block diagram of a system in the form of a computer system 330 including a controller 332 and a neural network 334 in accordance with a number of embodiments of the present disclosure. The system 330 can be, for instance, a server system and/or a high-performance computing (HPC) system and/or a portion thereof. The controller 332 can comprise a state machine, a sequencer, and/or some other type of control circuitry, and include hardware and/or firmware (e.g., microcode instructions) in the form of an application specific integrated circuit (ASIC), field programmable gate array, etc. The controller 332 can be located local to each of a plurality of memory devices 300-1, 300-2, 300-3, . . . , 300-N. Stated differently, although one controller 332 is illustrated in FIG. 3, the memory system 330 can include a plurality of controllers each being located local to respective memory devices 300-1, . . . , 300-N. In some examples, the neural network 334 can be dynamic random access memory (DRAM). The neural network 334 can include a plurality of memory devices 300-1, . . . , 300-N.

In various embodiments, the plurality of memory devices 300-1, . . . , 300-N can be three-dimensional (3D) and can include multiple layers stacked together. As an example, each of the plurality of memory devices 300-1, . . . , 300-N can include a first layer including a logic component (e.g., logic blocks, row drivers, and/or column drivers), and a second layer stacked on the first layer and including a memory component such as an array or memory cells. The plurality of memory devices 300-1, . . . , 300-N can comprise memory cells arranged in rows coupled by access lines (which may be referred to herein as word lines or select lines) and columns coupled by sense lines (which may be referred to herein as digit lines or data lines). The array of memory cells can include, but are not limited to, a DRAM array, SRAM array, STT RAM array, PCRAM array, TRAM array, RRAM array, NAND flash array, and/or NOR flash array, for instance. The plurality of memory devices 300-1, . . . , 300-N can be in the form of a plurality of individual memory die and/or distinct memory layers formed as integrated circuits on a chip. In some examples, each of the memory devices 300-1, . . . , 300-N can include a memory array 302-1, . . . , 302-P coupled to a complementary metal-oxide-semiconductor (CMOS) 304-1, 304-2, 304-3, . . . , 304-Q. Each CMOS 304-1, . . . , 304-Q can include a plurality of spiking neural units, as illustrated in FIG. 2.

The memory devices 300-1, . . . , 300-N can transmit data to and from the controller 332 via communication lines 336-1, . . . , 336-6. The controller 332 can send a command (e.g., an input) via communication lines 336-1, . . . , 336-6 and one or more of the plurality of memory devices 300-1, . . . , 300-N. The command can be an electrical signal sent from the controller 332 to one or more of the plurality of memory devices 300-1, . . . , 300-N. In some examples, the controller 332 can send a command to increase a weight stored in the plurality of memory cells of the memory array 302-P of memory device 300-N. The command can be sent from the controller 332 to memory device 300-N via communication line 336-3, memory device 300-3, and communication line 336-4.

In a number of embodiments, the plurality of memory devices 300-1, ..., 300-N can receive a number of different commands from controller 332. For example, the plurality of memory devices 300-1, ..., 300-N can receive commands to collect the weight from the plurality of memory cells of the memory array, accumulate the weight with an increase based on the input, compare the accumulated weight to a threshold weight, and/or provide an output to the controller 332 in response to the accumulated weight being greater than the threshold weight.

In some examples, one or more of the memory devices 300-1, ..., 300-N can provide an output (e.g., an electrical signal) to controller 332 via communication lines 336-1, ..., 336-6 and one or more memory devices 300-1, ..., 300-N. For example, memory device 300-2 can send an output to controller 332 via communication line 336-2, memory device 300-1, and communication line 336-1. The output can be provided by one or more of the plurality of memory devices 300-1, ..., 300-N in response to receiving a command from the controller 332 to provide the output.

Controller 332 can also send refresh and/or erase commands to the plurality of memory devices 300-1, ..., 300-N. Refresh commands can direct one or more of the plurality of memory devices 300-1, ..., 300-N to refresh one or more memory cells. A refresh can include a read and write operation on one or more memory cells. For example, a refresh can rewrite the weight stored in the one or more memory cells to preserve the weight data. The controller 332 can send a refresh command in response to the weight being less than or equal to a threshold weight. As discussed in connection with FIG. 2, the threshold weight can be a sufficient weight for learning to occur.

An erase command can direct one or more of the plurality of memory devices 300-1, ..., 300-N to erase one or more memory cells. An erase can remove data from one or more memory cells. For example, an erase can dissipate the weight stored in the one or more memory cells. The weight stored in the one or more memory cells can be removed in response to the weight being greater than and/or equal to a threshold weight.

Although not shown in FIG. 3, the memory system 330 can also include a decoder (e.g., row/column decoders) that can be controlled by the controller 332 to decode address signals received from a host, for instance. The decoded address signals can be further provided, via the controller 332, to row/column drivers, which can activate rows/columns of an array of memory cells of the plurality of memory devices 300-1, ..., 300-N.

Figure 4:
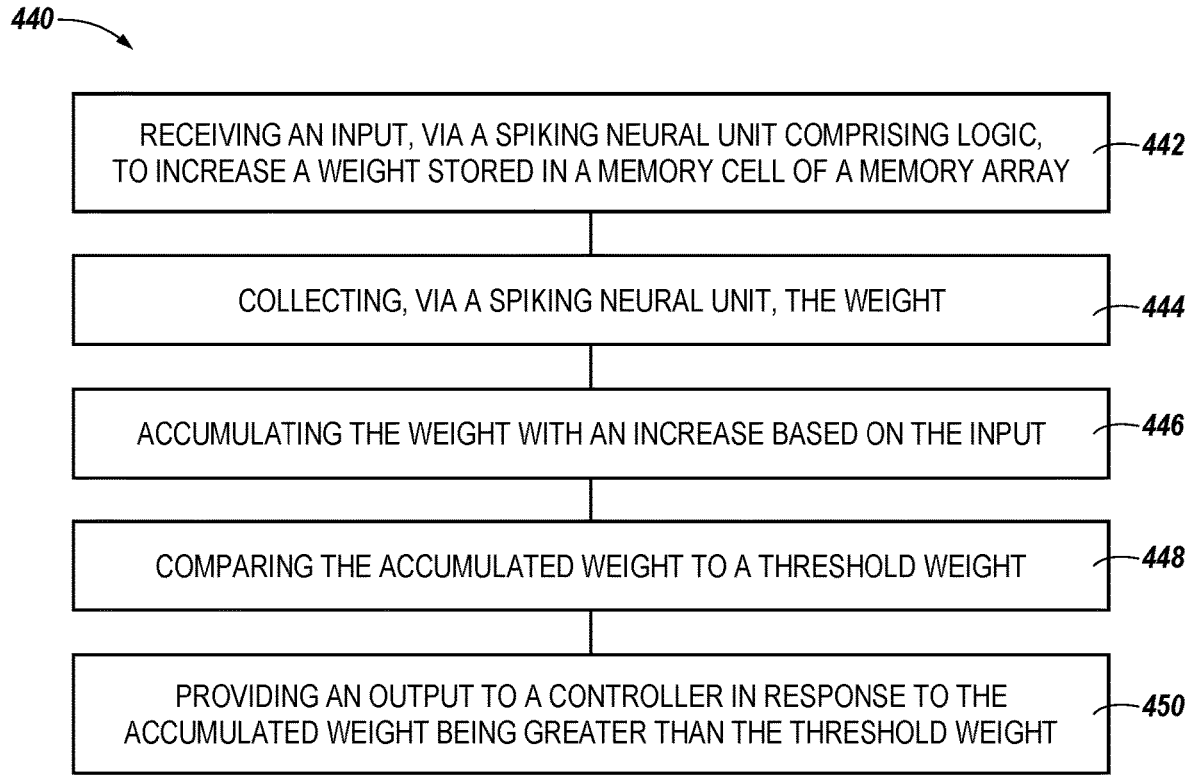
FIG. 4 illustrates an example flow diagram of a method for a spiking neural unit in accordance with a number of embodiments of the present disclosure.

FIG. 4 illustrates an example method 440 for a spiking neural unit in accordance with a number of embodiments of the present disclosure. Method 440 can be performed, for example, by memory device 100 and/or 300, described in connection with FIGS. 1 and 3, respectively.

At block 442, method 440 includes receiving an input, via a spiking neural unit comprising logic, to increase a weight stored in a memory cell of a memory array. The input can be an electrical signal. For example, the input can be a voltage applied to one or more memory cells of an array that is coupled to the spiking neural unit. The input can be sent from a different spiking neural unit and/or a controller. One or more data lines between the spiking neural unit and the different spiking neural unit and/or the controller can transmit the input.

At block 444, method 440 includes collecting, via a spiking neural unit, the weight. The weight can be collected via a multiplexor. The weight can be collected in response to a particular period of time passing since previously collecting the weight, in response to a particular number of signals being applied to the one or more memory cells, and/or in response to the one of the plurality of spiking neural units receiving a command.

At block 446, method 440 includes accumulating the weight with the increase based on the input. The weight can be accumulated by performing a sum calculation. For example, the spiking neural unit can perform a sum calculation to determine the weight with the increase based on the input.

At block 448, method 440 includes comparing the accumulated weight to a threshold weight. The accumulated weight can be compared to the threshold weight by a spiking neural unit. The threshold weight can be a sufficient weight for learning to occur. The accumulated weight and the threshold weight can be compared in response to a particular period of time passing since previously comparing, in response to accumulating the weight, and/or in response to the spiking neural unit receiving a command. In some examples, the accumulated weight and the threshold weight can be compared using a comparator.

At block 450, method 440 includes providing an output to a controller in response to the accumulated weight being greater than the threshold weight. The output (e.g., the result of the comparison of the accumulated weight to the threshold weight) can be provided from a spiking neural unit to a different spiking neural unit. For example, the spiking neural unit can send the output to the different spiking neural unit and/or to a controller via the different spiking neural unit. In some examples, the output can be provided in response to the accumulated weight being greater than the threshold weight. For example, the spiking neural unit can send the output to a controller to notify the controller that learning has occurred.

Figure 5:
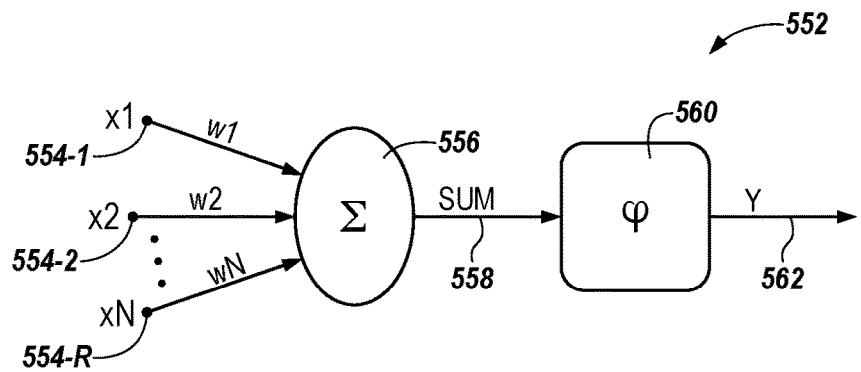
FIG. 5 illustrates an example of an artificial neuron in accordance with a number of embodiments of the present disclosure.

FIG. 5 illustrates an example of an artificial neuron 552 in accordance with a number of embodiments of the present disclosure. The artificial neuron 552 can be used to mimic a biological neuron (e.g., of a human brain). Such neurons can sometimes be referred to as perceptrons. A number of inputs x1 to xN, which can be referred to as stimuli, can be respectively applied to inputs 554-1, 554-2, ..., 554-R of neuron 552. Signals, such as voltages, currents, or particular data values (e.g., binary digits) corresponding to inputs x1 to xN can be generated responsive to sensing some form of stimuli and can be applied to inputs 554-1, 554-2, ..., 554-R.

In various instances, the inputs x1 to xN can be respectively weighted by the weights w1 to wN that can be referred to as synaptic weights. For example, inputs x1 to xN can be respectively multiplied by the weights w1 to wN to weight inputs x1 to xN, respectively. For example, each weighted input can be referred to as a synapse, and the weight can correspond to a memory in human brain behavior.

Neuron 552 can include a summation function 556 that can perform an addition operation on the weighted inputs to produce an output 558, such as SUM=x1$w$1+x2$w$2+ ... +xN$w$N. In neural network theory, for example, "SUM" can be referred to as "NET" (e.g., from the term "NETwork"). For example, the weighted signals corresponding to weighted inputs x1$w$1 to xN$w$N can be summed. In some examples, the summation function can be referred to as a transfer function. Neuron 552 further includes a function 560, such as a function φ, configured to respond to the summation SUM and to generate an output value Y at an output 562. In some examples, function 560 can be referred to as an activation function. Outputs of neurons can sometimes be referred to as classes.

Various functions can be utilized for the function 560. For example, function 560 can include a threshold function (e.g., a step function) to determine if SUM is above or below a particular threshold level. Such a threshold function might generate a logic high output (e.g., a logical 1) on the output 562 if SUM is greater than or equal to the particular threshold amount and might generate a logic low (e.g., a logical 0) on the output 562 if SUM is below the particular threshold amount.

In some examples, function 560 can be a sigmoid function, wherein the sigmoid function might be expressed as $S(z)=1/(1+e^{\lambda z})$, in which $\lambda$ is a constant and z can be SUM. For example, function 560 can be a non-linear function. In some examples, the generated output value Y at the output 562 can be applied to a number of additional neurons, such as to inputs 554 of different neurons, of a neural network (e.g., neural network 334 in FIG. 3) of neurons. The function 560 can further include a sign function and/or linear function, among others.

Figure 6:
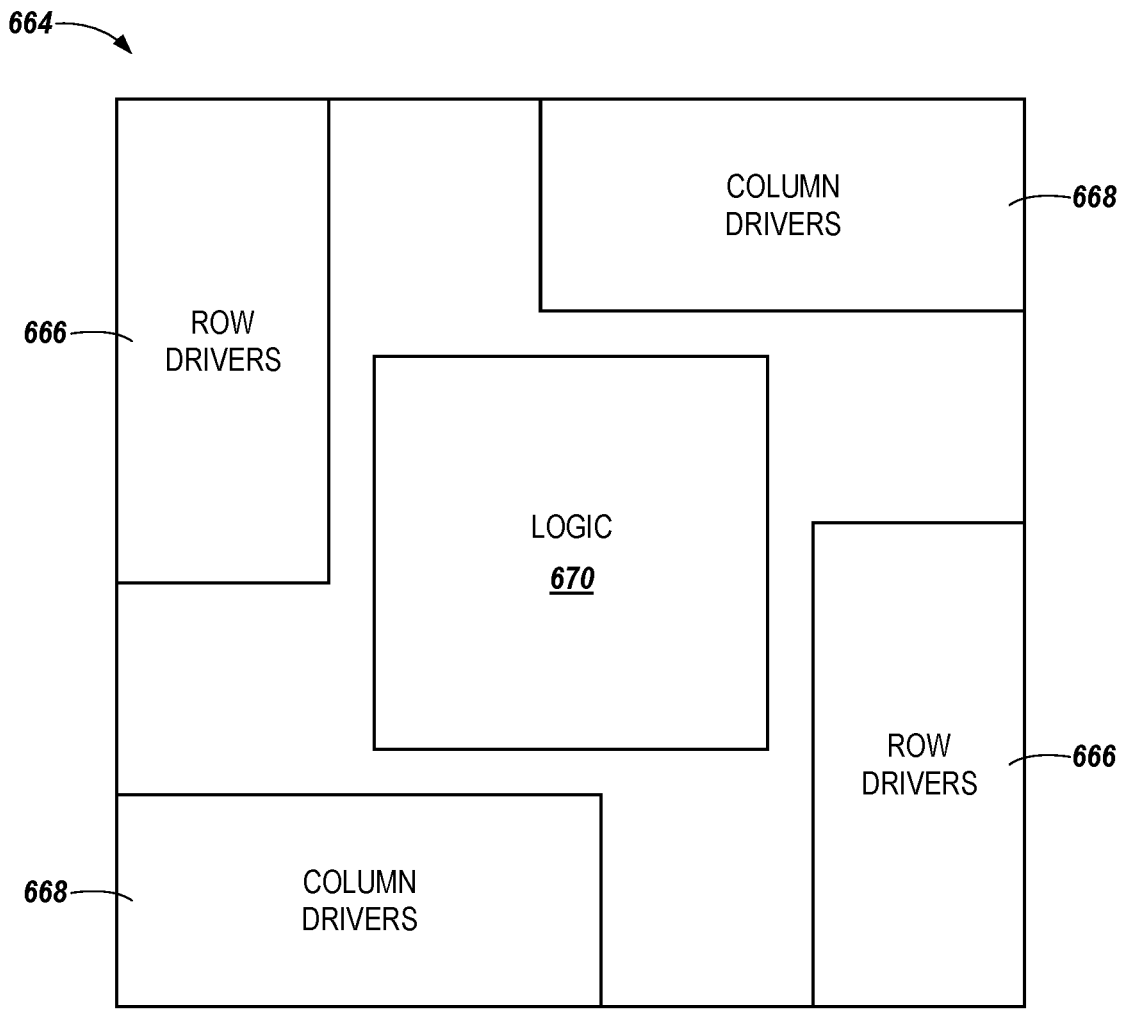
FIG. 6 is a block diagram of an example logic block of a memory device in accordance with a number of embodiments of the present disclosure.

FIG. 6 is a block diagram of an example logic block 664 of a memory device in accordance with a number of embodiments of the present disclosure. The logic block 664 may be one of a plurality of logic blocks included within a memory device such as memory device 100 and/or 300 as previously described in connection with FIGS. 1 and 3, respectively.

A logic block can be a configurable logic block (CLB) that is a fundamental building block of a field programmable gate array (FPGA). A FPGA refers to a chip having an ability to change its data paths and/or be reprogrammed while in the field. With such an ability, the FPGA can flexibly switch between, for example, central processing unit (CPU) and graphics processing unit (GPU). As an example, the FPGA that has been functioning as a microprocessor can be reprogrammed, while in the field, to function as a graphic card and/or an encryption unit.

As illustrated in FIG. 6, the logic block 664 includes logic 670. The logic 670 can be a LUT-based logic. As an example, a physical location (e.g., address) of the logic 670 can be mapped to a logical address and the mapping information can be stored in a lookup table.

The logic block 664 can further include row drivers 666, and column drivers 668 that can be enabled to activate a row (or rows) and/or a column (or columns) of a memory array 102 and/or 302 as previously described in connection with FIGS. 1 and 3, respectively. As described herein, row drivers 666 and column drivers 668 can receive address signals decoded by respective row decoders and column decoders that are controllable by a controller such as controller 332 previously described in connection with FIG. 3. Although not shown in FIG. 6, the logic block 664 can also include (e.g., be coupled to) a plurality of data buses coupling logic block 664 to another logic block and/or another external device (e.g., device located external to memory device 300). A data bus of the logic block 664 that couples the logic block 664 to another logic block can include an interconnect fiber.

FIG. 7 illustrates an example neural network 734 in accordance with a number of embodiments of the present disclosure. Neural network 734 can include a neural network layer 772 (e.g., input layer) having nodes 774-1 to 774-S, including spiking neural units 108 and/or 208 as previously described in connection with FIG. 1 and FIG. 2, respectively, that receive various inputs, such as inputs x1 to xN as previously described in connection with FIG. 5. Nodes of each neural network layer (e.g., neural network layers 772, 773-1, 773-2, 773-3, and 776) can correspond to artificial neurons as described herein.

Neural network 734 can include neural network layers 773-1, 773-2, 773-3. Neural network layer 773-1 can include nodes 778-1 to 778-L. As illustrated in an interconnection region 780-1, each of the respective nodes 778-1 to 778-L can be coupled to receive inputs from nodes 774-1 to 774-S. Neural network layer 773-2 can include nodes 782-1 to 782-L. As illustrated in an interconnection region 780-2, each of the respective nodes 782-1 to 782-L can be coupled to receive inputs from nodes 778-1 to 778-L. Neural network layer 773-3 can include nodes 784-1 to 784-L. As illustrated in an interconnection region 780-3, each of the respective nodes 784-1 to 784-L can be coupled to receive inputs from nodes 782-1 to 782-L. The neural network 734 may be configured in a training process in which the various connections in the interconnection regions 780 are assigned a weight value or updated with a new weight value that is used for operations or computations at nodes 778, 782, or 784. The training process may be different depending on a particular application or use of the neural network 734. For instance, a neural network may be trained for image recognition, speech recognition, or any number of other processing or computational tasks.

Neural network 734 can include an output layer 776 having output nodes 786-1 to 786-K. Each of the respective output nodes 786-1 to 786-K can be coupled to receive inputs from nodes 784-1 to 784-L. The process of receiving usable outputs at output layer 776 and output nodes 786 as a result of inputs fed into nodes 774 at neural network layer 772 may be referred to as inference or forward propagation. That is, input signals representative of some real world phenomena or application may be fed into a trained neural network 734 and through inference that occurs as a result of calculations enabled by various nodes and interconnects, a result may be output. In the case of a neural network 734 trained for speech recognition, the input may be signals representative of human speech in one language, and the output may be signals representative of human speech in a different language. Or for a neural network 734 trained for image recognition, the input may be signals representative of a photograph and the output may be signals representative of the subject in the photograph.

As described herein, multiple neural networks may be configured within a memory device. The multiple neural networks may be separately trained (either locally or remotely) and the trained neural networks may be used for inference within the memory device. The multiple neural networks may perform the same or different functions and may have the same or different weights relative to one another.

Figure 8:
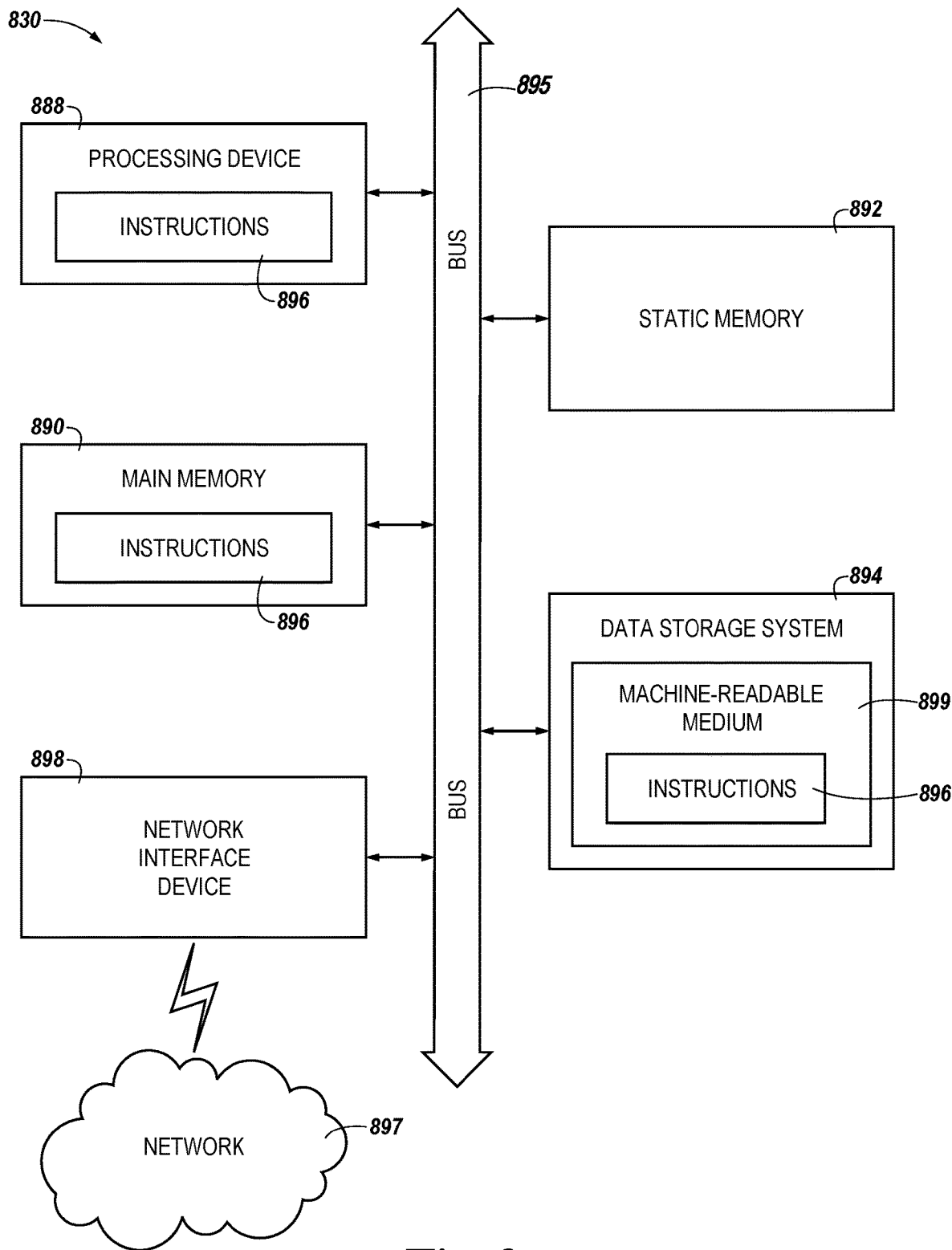
FIG. 8 illustrates an example machine of a computer system within which a set of instructions, for causing the machine to perform various methodologies discussed herein, can be executed.

FIG. 8 illustrates an example machine of a computer system 830 within which a set of instructions for causing the machine to perform various methodologies discussed herein can be executed. In various embodiments, the computer system 830 (e.g., computer system 330 in FIG. 3) can be coupled to or utilize a memory sub-system or can be used to perform the operations of a controller (e.g., controller 332 in FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 830 includes a processing device 888, a main memory 890 (e.g., read-only memory (ROM), flash memory, dynamic random access memory (DRAM) such as synchronous DRAM (SDRAM) or Rambus DRAM (RDRAM), etc.), a static memory 892 (e.g., flash memory, static random access memory (SRAM), etc.), and a data storage system 894, which communicate with each other via a bus 895.

Processing device 888 represents one or more general-purpose processing devices such as a microprocessor, a central processing unit (CPU), or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 888 can also be one or more special-purpose processing devices such as an application specific integrated circuit (ASIC), a field programmable gate array (FPGA), a digital signal processor (DSP), network processor, or the like. The processing device 888 is configured to execute instructions 896 for performing the operations and steps discussed herein. The computer system 830 can further include a network interface device 898 to communicate over the network 897.

The data storage system 894 can include a machine-readable storage medium 899 (also known as a computer-readable medium) on which is stored one or more sets of instructions 896 or software embodying any one or more of the methodologies or functions described herein. The instructions 896 can also reside, completely or at least partially, within the main memory 890 and/or within the processing device 888 during execution thereof by the computer system 830, the main memory 890 and the processing device 888 also constituting machine-readable storage media.

In one embodiment, the instructions 896 include instructions to implement functionality corresponding to a memory device (e.g., memory device 100 in FIG. 1). While the machine-readable storage medium 899 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein, will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a controller;
   a first memory array;
   a first complementary metal-oxide-semiconductor (CMOS) coupled to the first memory array and located under the first memory array;
   a second memory array; and
   a second CMOS coupled to the second memory array and located under the second memory array, wherein the second CMOS is configured to:
     receive an input to increase a weight stored in a memory cell of the second memory array;
     collect the weight from the memory cell of the second memory array in response to a particular period of time passing since previously collecting the weight, wherein the particular period of time is set based on an average time it takes the weight to reach a threshold weight;
     accumulate the weight with an increase based on the input;
     compare the accumulated weight to the threshold weight; and
     provide an output to the controller in response to the accumulated weight being greater than the threshold weight, wherein the controller is configured to send a refresh command to the second CMOS in response to the accumulated weight being less than or equal to the threshold weight, and wherein the accumulated weight is rewritten in response to the refresh command, wherein rewriting the accumulated weight prevents the accumulated weight from changing over time.

2. The apparatus of claim 1, wherein the first memory array is coupled to the second memory array.

3. The apparatus of claim 1, wherein the controller is external to the second memory array and the second CMOS.

4. The apparatus of claim 3, wherein the second CMOS is further configured to provide the output to the controller via the first memory array.

5. The apparatus of claim 1, wherein the second memory array is formed on the second CMOS; and wherein the second CMOS is further configured to collect the weight from a plurality of memory cells of the second memory array via a multiplexor.

6. The apparatus of claim 1, wherein the second CMOS is further configured to store the accumulated weight in the second memory array in response to the accumulated weight being less than the threshold.

7. A method comprising:
receiving an input, via a first complementary metal-oxide-semiconductor (CMOS) located below a first memory array, to increase a weight stored in a memory cell of the first memory array;
collecting, via the first CMOS, the weight in response to a particular period of time passing since previously collecting the weight, wherein the particular period of time is set based on an average time it takes the weight to reach a threshold weight;
accumulating the weight with an increase based on the input;
comparing the accumulated weight to the threshold weight;
providing an output to a controller coupled with the first memory array, via a second memory array located above a second CMOS, in response to the accumulated weight being greater than the threshold weight; and
sending a refresh command to the second CMOS in response to the accumulated weight being less than or equal to the threshold weight, wherein the accumulated weight is rewritten in response to the refresh command, wherein rewriting the accumulated weight prevents the accumulated weight from changing over time.

8. The method of claim 7, further comprising refreshing the weight stored in the memory cell in response to the first CMOS receiving a refresh command from the controller.

9. The method of claim 7, further comprising erasing the weight stored in the memory cell in response to the first CMOS receiving an erase command from the controller.

10. The method of claim 7, further comprising sending the result of the comparison to the controller via the second memory array.

11. The method of claim 7, further comprising collecting, via a multiplexor of the first CMOS, the weight in response to the first CMOS receiving a command from the controller.

12. The method of claim 7, further comprising collecting, via a multiplexor of the first CMOS, the weight in response to a particular number of signals being applied to the memory cell.

13. A system, comprising:
a controller; and
a neural network coupled to the controller, wherein the neural network includes:
a first memory array;
a first complementary metal-oxide-semiconductor (CMOS) coupled to the first memory array and located under the first memory array;
a second memory array; and
a second CMOS coupled to the second memory array and located under the second memory array, wherein the second CMOS is configured to:
receive an input to increase a weight stored in a plurality of memory cells of the second memory array;
collect the weight from the plurality of memory cells of the second memory array in response to a particular period of time passing since previously collecting the weight, wherein the particular period of time is set based on an average time it takes the weight to reach a threshold weight;
accumulate the weight with the increase based on the input;
compare the accumulated weight to the threshold weight; and
provide an output to the controller in response to the accumulated weight being greater than the threshold weight, wherein the controller is configured to send a refresh command to the second CMOS in response to the accumulated weight being less than or equal to the threshold weight, and wherein the accumulated weight is rewritten in response to the refresh command, wherein rewriting the accumulated weight prevents the accumulated weight from changing over time.

14. The system of claim 13, wherein the controller is configured to send an erase command to the second CMOS in response to the weight from the plurality of memory cells being greater than the threshold weight.

15. The system of claim 13, wherein the neural network is dynamic random access memory (DRAM).

16. The system of claim 13, wherein the plurality of memory cells are a word of memory cells.

* * * * *